J. DAWSON.
Attachment for Hose.
No. 205,251. Patented June 25, 1878.
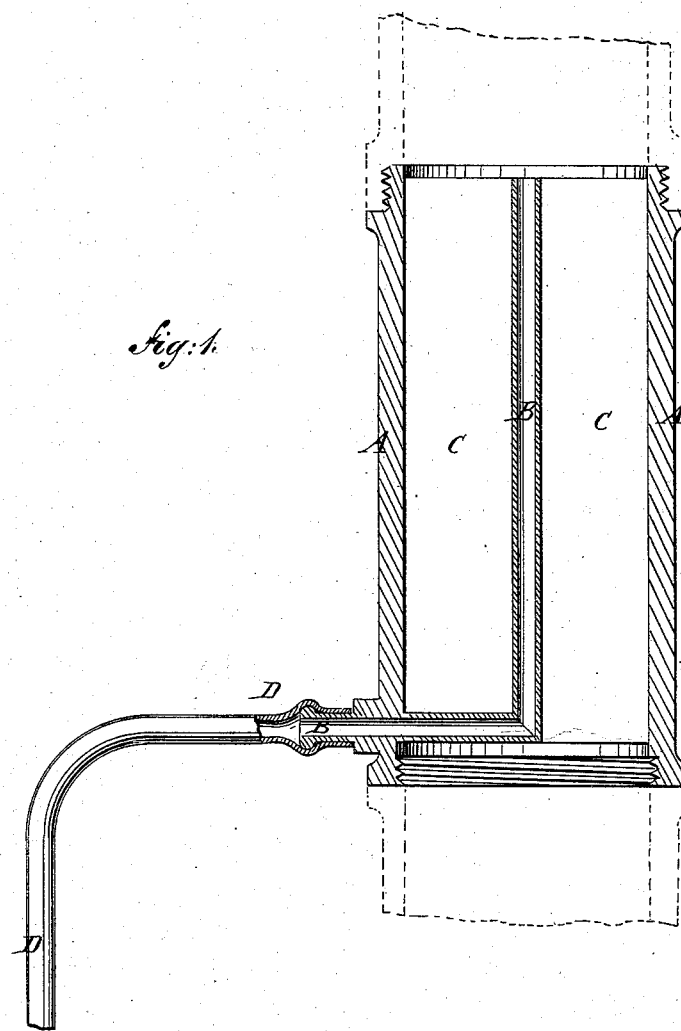
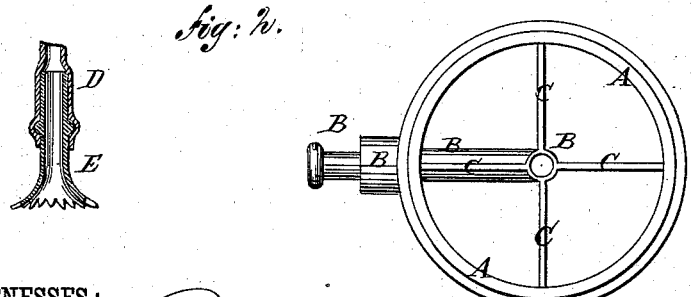
WITNESSES:
Chas. Nida
C. Sedgwick
INVENTOR:
J. Dawson
BY Munn & Co
ATTORNEYS.

UNITED STATES PATENT OFFICE.

JAMES DAWSON, OF BROOKLYN, NEW YORK.

IMPROVEMENT IN ATTACHMENTS FOR HOSE.

Specification forming part of Letters Patent No. 205,251, dated June 25, 1878; application filed May 17, 1878.

*To all whom it may concern:*

Be it known that I, JAMES DAWSON, of Brooklyn, in the county of Kings and State of New York, have invented a new and useful Improvement in Attachment for Hose, of which the following is a specification:

Figure 1 is a longitudinal section of my improved attachment. Fig. 2 is an end view of the same.

Similar letters of reference indicate corresponding parts.

The object of this invention is to furnish an improved attachment for the hose of fire-engines, the use of which will enable liquid chemicals to be introduced into the stream of water passing through the hose, so as to be thrown upon the fire with said water, and thus avoid the necessity of having a separate engine for throwing chemicals.

The invention consists in the combination of the pipe and its radial supporting-wings with the tube of a hose coupling or nozzle for introducing liquid chemicals into the stream of water passing through the said hose or nozzle, as hereinafter fully described.

A is a short tube, which may be used as a hose-coupling for connecting two sections of hose, or for connecting the hose to the engine, or which may be a part of the nozzle, as may be desired. B is a small pipe, which passes in through the side of the tube A near its rear end, extends to the center of the said tube, and is then bent at right angles, passing along the said center, as shown in Figs. 1 and 2.

The pipe B is supported and held in place in the center of the tube A by radial wings C formed upon it and upon the said pipe A.

The tube A, the pipe B, and the wings C may be cast in one piece, if desired.

Upon the outer end of the tube B, which projects from the outside of the pipe A, is formed a neck for the attachment of a rubber tube, D, which may be of any desired length, and the other end of which is designed to be placed in the vessel containing the liquid chemicals.

The free end of the rubber tube D may be provided with a metallic foot, E, the outer end of which is serrated or perforated to prevent the said outer end of the tube D from being closed by contact with the vessel or by impurities that may be in it.

With this construction, when the engine is operated and a stream of water forced through the tube A, the tendency will be to form a vacuum at the forward end of the pipe B, which will cause the chemicals to pass through the tubes D B and be carried onward by and with the stream of water passing through the said hose, so as to be projected upon the fire.

This construction enables chemicals to be used in extinguishing fires by means of the ordinary fire-engines without its being necessary to have engines constructed expressly for such use, and the use of which at the same time will not interfere with the proper operation of the engine for throwing water.

I prefer to place the device A B C near the engine, so that the vessel containing the chemicals may be placed at the side of or upon the said engine, so as to be out of the way, and at the same time allow the hose to be carried about as may be required.

Having thus described my invention, I claim as new and desire to secure by Letters Patent—

The combination of the pipe B and its radial supporting-wings C with the tube A of the hose coupling or nozzle for introducing liquid chemicals into the stream of water passing through the said hose or nozzle, substantially as herein shown and described.

JAMES DAWSON.

Witnesses:
WILLIAM H. EGGINTON,
JOHN F. BROPHY.